United States Patent

[11] 3,611,330

[72] Inventor Ramon A. Cacossa
 Arlington, Mass.
[21] Appl. No. 791,267
[22] Filed Jan. 15, 1969
[45] Patented Oct. 5, 1971
[73] Assignee The United States of America as
 represented by the Administrator of the
 National Aeronautics and Space
 Administration

[54] METHOD OF DETECTING IMPENDING
 SATURATION OF MAGNETIC CORES
 4 Claims, 7 Drawing Figs.
[52] U.S. Cl. .......................................... 340/174 CT,
 340/174 AG, 340/174 GA, 340/174 SC
[51] Int. Cl. ............................................. G11c 11/08
[50] Field of Search............................................340/174 CT

[56] References Cited
UNITED STATES PATENTS
2,907,957 10/1959 Dewitz ......................... 333/29
2,907,991 10/1959 Van Allen .................... 340/207
2,988,731 6/1961 Kam Li......................... 340/174

Primary Examiner—James W. Moffitt
Attorneys—John R. Manning, Herbert E. Farmer and Garland T. McCoy ABSTRACT: This disclosure describes an apparatus for detecting impending saturation in magnetic cores. A saturable core, which may be toroidally formed, has an aperture in the circumference of the toroid. Windings are separately wound around the toroid between the aperture and the outer edge of the toroid and between the aperture and the inner edge of the toroid. The windings are serially connected in voltage-opposing relation. When saturation of the core starts to occur in one direction or the other, a voltage unbalance in the windings occurs. This unbalance causes a signal to occur which is detectable and indicates the start of saturation.

PATENTED OCT 5 1971 3,611,330

*INVENTOR*
Ramon A. Cacossa

BY John R. Manning
How Coy ATTORNEYS

INVENTOR
Ramon A. Cacossa

BY John R. Manning
Howe Coy ATTORNEYS

METHOD OF DETECTING IMPENDING SATURATION OF MAGNETIC CORES

The invention described herein was made by an employee of the United States Government and may be manufactured and used by or for the Government for governmental purposes without the payment of any royalties thereon or therefor.

BACKGROUND OF THE INVENTION

Saturable core magnetic devices have found widespread use in recent years, mainly in inverter circuits. While the use of saturable magnetic core devices in inverter and other electronic circuits has certain advantages, it also has certain disadvantages. A primary disadvantage of the saturable core transformer is that the BH-loop of an uncut core will not necessarily center around the origin of the BH coordinates and the slightest DC imbalance in the circuit causes the BH-loop to incorporate one of the saturable levels of the core material. The DC imbalance can be caused by a difference in the switching elements, a difference in the resistance of the primary windings or an imbalance between alternating cycles, for example. Saturation of the magnetic core material due to an imbalance deprives the individual primary circuits of essentially all of their series impedance and results in rapidly increasing short circuit currents. These short circuit currents cause substantial power losses and may eventually cause system breakdown by fatally damaging switching elements, for example.

A new saturable core transformer inverter and other electronic circuits have been developed that attempt to overcome the saturation problem. These circuits operate on the philosophy that if switching is controlled by saturation, undesirable short circuit currents will not occur. That is, the circuits normally comprise a saturable core transformer having at least two primary windings—one sense winding and one power winding. The sense winding senses saturation and stops the application of power to the power winding when saturation occurs. Alternatively, a pair of sense and a pair of power windings may be provided. Then, when saturation occurs in one direction, a switching means switches the power from one power winding to the other power winding. Normally, the switching means is a solid-state switching means, such as a transistor.

While inverters and other electronic circuits of the foregoing nature have found widespread use, they possess certain inherent and significant disadvantages. Specifically, the core saturation process consumes a relatively small, but finite, time interval at moderate frequencies of operation. When the frequency of operation increases, the duration of core saturation time becomes comparable to the time constants governing the switching components. The problem of delayed current turnoff is further compounded, because the signal that energizes the switching means is maintained on during the saturation process of the transformer core as long as the magnetic flux continues to change. This means that the switch is closed during the interval in which the magnetic flux density follows the knee of the BH-loop towards saturation and remains closed until a lapse of the involved time constant permits the removal of the signal and the subsequent opening of the switch. A short circuit current builds up during these intervals and creates heat. The heating effect is tolerable as long as the number of events per unit time (frequency of operation) is moderate. However, if the transition interval toward magnetic core saturation becomes comparable to the duration of one cycle of operation, the corresponding cumulative heat dissipation and power loss becomes unacceptable.

Another prior art apparatus for detecting the impending saturation of a magnetic core detects the current flow difference between the transformer's primary and secondary windings. This difference is the magnetizing current of the transformer and, if the transformer has an equal number of turns in the primary winding to the number of turns in the secondary winding, the primary and secondary currents will be almost equal until the transformer core saturates. At this point, the secondary current approaches zero, while the primary current rises so that the magnetizing current also rises. The primary and secondary windings are connected to a further transformer in opposition. And, when saturation is reached, the difference in current between the primary and secondary circuits is transformed into a voltage that is utilized to open a switch in the primary circuit. The disadvantage of this circuit is that the entire magnetic core is nearly saturated when the voltage that opens the switch is developed, and there may not be enough flux capacity left in the core to provide a continued induced voltage across the primary of the saturable transformer while the switch is in its storage time region. That is, the switch, which is usually a transistor, requires a storage time before switch action occurs. And, the primary winding of the saturable core transformer must continue inducing voltage during this period of time or else undesirable high currents flow through the switch. If the saturable core transformer is nearly saturated when the turnoff switch signal occurs, it cannot maintain flux during this period of time. In addition, this method of detecting saturation does not work if the secondary current is out of phase with the primary current as in the case of an inductor with two windings.

Another environment where the foregoing apparatus will not satisfactorily operate is where a voltage source is connected to the primary winding of an inductor to apply a voltage to the inductor and the secondary winding includes a diode to prevent the application of the voltage stored in the inductor until the switch in the primary winding is open. In this type of system, the primary and secondary winding currents cannot be subtractively connected together while the core is being saturated, because no current flows in the secondary winding circuit during this period of time.

Therefore, it is an object of this invention to provide an apparatus for detecting impending saturation in magnetic cores.

It is another object of this invention to provide an apparatus for protecting saturable core systems that senses the impending saturation of the core early enough to prevent the continued application of power to the core.

It is another object of this invention to provide an apparatus for detecting impending saturation in magnetic core devices so that the occurrence of short circuit currents can be prevented.

It is a further object of this invention to provide an apparatus for protecting electrical systems, including saturable core devices from undesirable short circuits, that is operable at high frequencies.

SUMMARY OF THE INVENTION

In accordance with a principle of this invention, an apparatus for detecting impending saturation in magnetic cores is provided. The apparatus includes a saturable core of a predetermined geometric form. Means are provided for sensing the magnetic field in two different mean paths in the magnetic core. The sensed field signals are compared in a predetermined manner so that an overall signal representing impending saturation is generated when saturation starts to occur.

In accordance with another principle of this invention, the transformer core is toroidal in shape and the sensing means are windings that are wound through an aperture in the circumference of the toroid core.

In accordance with a further principle of this invention, the windings are series connected in voltage opposition, and a signal is generated when one winding senses saturation but the other does not. The signal is utilized through suitable means to control the application of power to a primary winding or windings which apply power to the toroidal core.

In accordance with still a further principle of this invention, the output of oscillator means is compared with the output of the series-connected windings, and the comparison is utilized to switch off the application of power to the primary windings when saturation starts to occur.

It will be appreciated from the foregoing description that the invention is an uncomplicated apparatus for sensing or detecting impending saturation in magnetic cores. By utilizing windings that sense the occurrence of saturation along different paths in the core where the different paths reach saturation at different times in a saturation cycle, the invention provides a means for sensing a signal that indicates impending saturation in advance of complete saturation. The sensed signal is utilized to control the application of power by controlling switches which may be transistors, for example. The geometry of the core(s) can take on various configurations, such as toroidal, concentric toroidal, rectangular, and the like. In addition, the core can have an airgap.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENTS

Figure 1:
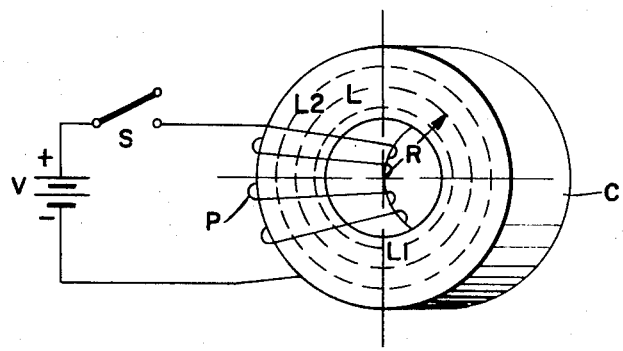
FIG. 1 is a pictorial diagram utilized to describe the basic concept of the invention.

The basic concept for detecting impending saturation in a magnetic core upon which the apparatus of the invention is based is illustrated in FIG. 1. FIG. 1 illustrates a toroidal magnetic core C having primary windings P wound around the circumference of the core. The primary windings P are connected through a switch S to a battery source V. When the switch is closed, current flows through the primary winding P and saturates the core C. The switch may be a solid-state switch, if desired.

The core has a circumferential mean path length L at a mean radius R from the center of the core. The magnetic field intensity H along path L is given by $H=NI/L$, where $N$ is the number of turns of winding P and $I$ is the current in winding P when S is closed. From this equation it is apparent that the magnetic field for other paths, such as L1 and L2 of FIG. 1, have equations given by $H1=NI/L1$ and $H2=NI/L2$. Since L1 is less than L2, $H1$ is greater than $H2$, or generally speaking, the magnetic field intensity $H$ is inversely proportional to the path length $L$.

From the foregoing discussion, it will be appreciated by those skilled in the art that saturation in a magnetic core of the general type illustrated in FIG. 1 does not occur uniformly throughout the core. Rather, saturation occurs first on the inside of the core (the shortest path) and proceeds outwardly to the exterior of the core (the longest path). It is upon this general theory that the invention operates.

Figure 2:
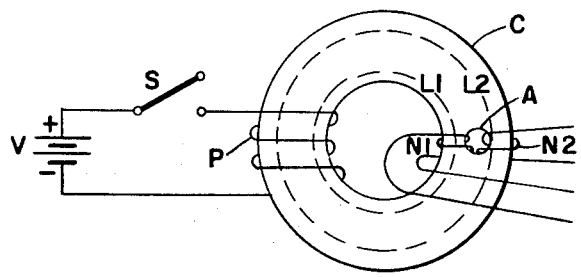
FIG. 2 is a schematic diagram illustrating one embodiment of the invention.

FIG. 2 is a pictorial diagram of one embodiment of the invention formed in accordance with the foregoing theory of operation. The embodiment illustrated in FIG. 2 comprises a toroidal core C having a primary winding P wound around a portion of its circumference. The primary winding P is connected by a switch S to a voltage source V. An aperture A is formed in the core C. The aperture A has a longitudinal axis that is parallel to the longitudinal axis of the toroidal core C. A first winding N1 is wound through the aperture about the interior of the core, and a second winding N2 is wound through the aperture A about the exterior of the core. Hence, winding N1 senses the magnetic field having a mean free path represented by L1 and winding N2 senses the magnetic field having a mean free path represented by L2. From the foregoing description of the theory of operation of the invention, it will be appreciated that winding N1 senses magnetic field H1 and winding N2 senses magnetic field H2.

Figure 3A:
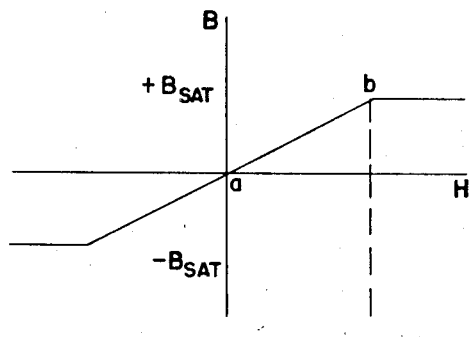
FIGS. 3A and 3B are diagrams utilized to describe the operation of the embodiment illustrated in FIG. 2.

If it is assumed for purposes of description that the magnetic core C has an idealized hysteresis loop of the type shown in FIG. 3A, then as the hysteresis loop is traversed from point "a" to point "b," the core material to the left of the aperture A, passing through winding N1 with mean path L1, achieves the level of $+B_{sat}$ before the core material to the right of the aperture A, passing through winding N2 with mean path L2, achieves the level $+B_{sat}$.

Figure 3B:
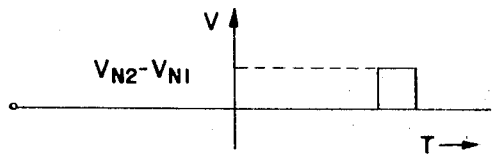

When S is first closed, voltages $V_{N1}$ and $V_{N2}$ are induced and build up in windings N1 and $N2$, respectively. When $+B_{sat}$ is reached in the magnetic material of mean path L1, voltage $V_{N1}$ drops to zero while voltage $V_{N2}$ is maintained until $+B_{sat}$ is reached in magnetic material of mean path L2. If the induced voltages of windings N1 and N2 are equal when S is first closed (corresponding to operating point a in FIG. 3A), and furthermore, if windings N1 and N2 are series connected in voltage opposition, a signal of the type shown in FIG. 3B is generated. This signal is equal to $V_{N2}-V_{N1}$ and indicates that a portion of the core C (mainly the magnetic material of mean path L1) has saturated and the saturation of the remaining magnetic material is impending.

It will be appreciated by those skilled in the art that the $V_{N2}-V_{N1}$ signal can be used to initiate the turnoff of switch S which, for example, may be a solid-state switch. Since the $V_{N2}-V_{N1}$ signal occurs before the entire core has been saturated, the core has a volt-second (flux) capacity to maintain the induced voltage of winding P during the storage time of switch S. Hence, switch S has time to open before short circuit currents flow through winding P.

If the aperture A is centered between the inner and outer edges of the core, meaning that the cross-sectional area of the material to the left of the aperture is equal to the cross-sectional area of the material to the right of the aperture, the $V_{N2}-V_{N1}$ signal occurs when one-half of the total volt-second capacity of the core is used. This allows a maximum time $t=N_p X \Delta B/2$ for the switch to be opened before complete saturation occurs. In the preceding equation:

$t=$ time;

$N_p=$ the number of turns of the primary winding P;

$X=$ the cross-sectional area of C, and $\Delta B=$ the maximum flux density range over which the core can operate in a given circuit.

Varying the location of the aperture A such that cross-sectional areas on either side of the aperture vary allows the $V_{N2}-V_{N1}$ signal to occur at other times before complete saturation of the core occurs. This variable time duration can be used to overcome delays in the turnoff signal path in addition to the storage time delay of the switch S. In addition, if the switch S is a thyristor, the thyristor turnoff time can be circumvented by this variation.

It will be appreciated from viewing FIG. 3B that the $V_{N2}-V_{N1}$ voltage signal occurs after the magnetic material of mean path L1 saturates and exists only until the magnetic material of mean path L2 saturates. At any later time, the $V_{N2}-V_{N1}$ signal returns to zero until S is opened.

It should be noted that, while a toroidal core of circular geometry is illustrated in FIGS. 1 and 2, the invention is equally applicable to magnetic cores of rectangular or other geometry. In addition, the invention is also applicable to magnetic cores that have airgaps. The only requirement is that windings N1 and N2 transversely encircle flux paths of dissimilar mean lengths.

Figure 4:
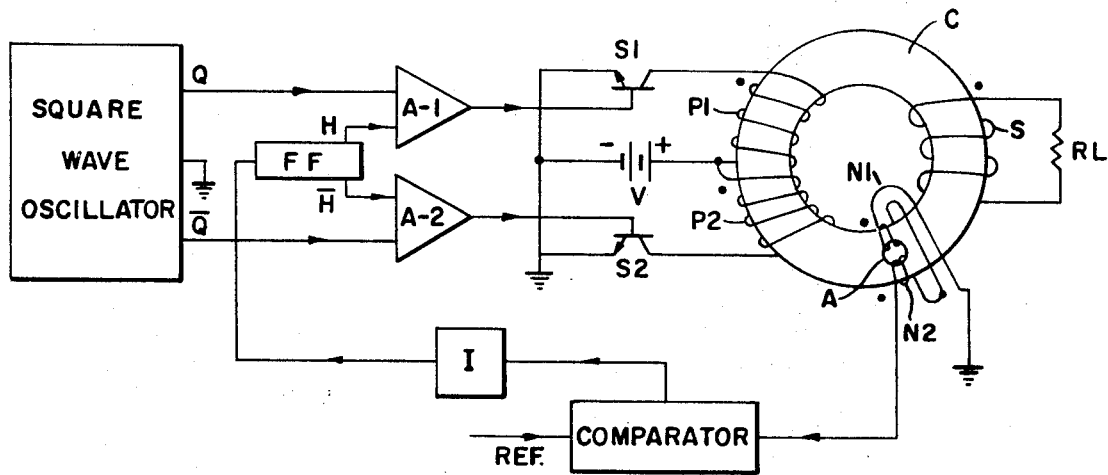
FIG. 4 is a schematic diagram of an alternate embodiment of the invention.

FIG. 4 illustrates an embodiment of the invention wherein a core of the type heretofore described is used in an inverter circuit to control the opening of transistor switches. The embodiment illustrated in FIG. 4 comprises a circular toroidal core C having first and second primary windings P1 and P2 wound around a portion of the circumference of the core. A secondary winding S is also wound around a portion of the circumference and is connected to a load resistor RL. Windings N1 and N2 are wound through an aperture A in the toroid in the manner heretofore described. Conventional dots are used on the various windings of FIG. 4 to indicate current directions.

Also illustrated in FIG. 4 is a square wave oscillator; a flip-flop designated FF; first and second two input AND gates designated A-1 and A-2; an inverter designated I, and a comparator. In addition, NPN transistor switches designated S1 and S2 are illustrated, as is a voltage source designated V.

Figure 5:
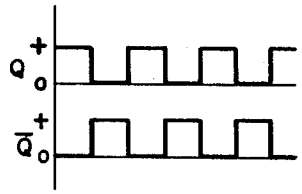
FIG. 5 is a timing diagram for a part of the embodiment illustrated in FIG. 4.

The dot end of N1 is connected to ground, and the nondot end of N1 is connected to the nondot end of N2. The dot end of N2 is connected to one input of the comparator. The comparator has a second input connected to a reference source (not shown). The output of the comparator is connected through I to the input of FF. FF generates complementary H and $\bar{H}$ outputs. The H output is connected to one input of A-1 and the $\bar{H}$ output is connected to one input of A-2. The square wave oscillator generates Q and $\bar{Q}$ outputs which, as illustrated in FIG. 5, are complementary outputs. The Q output is connected to the second input of A-1 and the $\bar{Q}$ output is connected to the second input of A-2. The output of A-1 is connected to the base S1 and the output of A-2 is connected to the base of S2. The emitters of S1 and S2 are connected to the negative side of V and to ground. The positive side of V is connected to the nondot end of P1 and the dot end of P2. The dot end of P1 is connected to the collector of S1 and the nondot end of P2 is connected to the collector of S2.

In operation, voltage source V is adapted to ultimately deliver power to the load RL. This power is transferred from V through the transformer which consists of core C and the P1, P2 and S windings. Transistor switches S1 and S2 alternately open and close to alternately impress a pulsating voltage across P1 and P2. This alternating voltage is induced across S, due to transformer action, which in turn delivers a voltage to RL. The switches S1 and S2 are alternately switched on and off to control the alternating operation. Specifically, if Q and H are both positive, S1 is switched on. Alternatively, if $\bar{Q}$ and $\bar{H}$ are positive, S2 is switched on. And, if Q and $\bar{H}$ or $\bar{Q}$ and H are positive, neither switch is on.

Normal operations of the system requires that Q and $\bar{Q}$ are positive (each in turn), as illustrated in FIG. 5, for a length of time sufficient for the magnetic core C to saturate. Initially, assume that S1 is closed and current is flowing through P1. For this condition, both H and Q are positive. And, because H and Q are the complements of $\bar{H}$ and $\bar{Q}$, respectively, $\bar{H}$ and $\bar{Q}$ are zero. S1 remains closed until the voltage at the dot end of N2 becomes positive, which indicates that the opposing voltages across N1 and N2 are not balanced. As previously described, this voltage signal occurs when the portion of the core being encircled by N1 becomes saturated. This voltage signal causes the comparator to generate an output signal which passes through I and causes FF to flip. When FF flips, H becomes zero and $\bar{H}$ becomes positive. At this point there is a zero and a positive input to A-1 and a zero and a positive to input A-2; hence, neither S1 or S2 is closed, because neither A-1 or A-2 generates a positive signal.

After a predetermined period of time, the square wave oscillator shifts outputs. When this occurs $\bar{Q}$ becomes positive and Q becomes negative, as illustrated by the timing diagram of FIG. 5. When $\bar{Q}$ becomes positive, A-2 generates an output signal, because its other input, $\bar{H}$, is also positive. The A-2 signal switches S2 closed and allows current from V to flow through P2. S2 remains closed until voltage signal from the dot end of N2 again occurs to indicate the oncoming of saturation. When this voltage signal occurs, the comparator generates an output signal that flips FF to its original state, so that $\bar{H}$ becomes zero and H becomes positive. From this description it will be appreciated that the output from the square wave oscillator determines when power is applied by closing S1 and S2, while the output from the series connected N1 and N2 windings determines when power stops by opening S1 and S2.

It will be appreciated from the foregoing description of the embodiment of the invention illustrated in FIG. 4 that the invention prevents complete saturation from occurring in the core by turning off power prior to complete saturation. Hence, the occurrence of short circuit currents that could cause the destruction of S1 or S2 are prevented. It will also be appreciated that the FIG. 4 embodiment can be modified so as to eliminate the square wave oscillator, if desired. That is, the output from FF can be connected directly to the inputs of S1 and S2. Then, S1 and S2 will be switched on or off as determined by the output from the N1 and N2 windings. However, such a system is not as frequency stable as the FIG. 4 embodiment.

Figure 6:
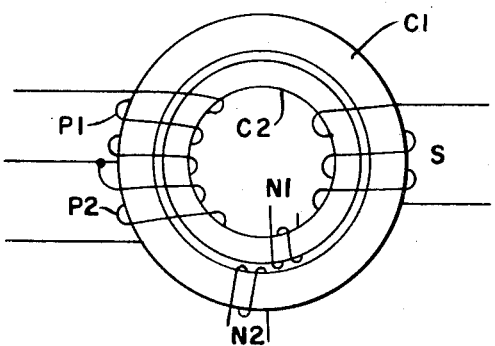
FIG. 6 is a further alternate embodiment of the invention.

FIG. 6 illustrates an alternative embodiment of the basic core structure of the invention. Rather than utilize an aperture A through a portion of the core, the core is entirely split into two sections C1 and C2. The sections are coaxial and the primary windings P1 and P2 are wound around both sections. Similarly, the secondary winding S is wound around both sections. However, the N1 and N2 windings are each separately wound around one section. That is, the N1 winding is wound around the inner section C1 and the N2 winding is wound around the outer section C2. Except for the difference in structure, the operation of the core illustrated in FIG. 2 is identical to the operation of the core previously described.

It will be appreciated from the foregoing description that the invention is a rather uncomplicated apparatus for preventing saturation from occurring in a saturable core material. The primary requirement is that the N1 and N2 windings be mounted on the core so as to sense magnetic sections that have different mean lengths. Because of the different mean lengths, one winding senses saturation prior to the other winding sensing saturation. By connecting the windings in circuit opposing relationship, an output voltage signal occurs when the first winding senses saturation, but the second winding does not. This signal is utilized to control the turnoff of the application of power to the primary winding, causing saturation in that direction.

It will be appreciated by those skilled in the art and others from the foregoing description of the preferred embodiments of the invention that the described invention can be modified without departing from the scope of that description. For example, other than transistor switches can be used as the S1 or S2 switches illustrated in the FIGS. In addition, other geometric arrangements, rather than a circular core, can be utilized. Hence, the invention can be practiced otherwise than as specifically described herein.

What is claimed is:

1. Saturable core apparatus comprising:
   a saturable magnetic core having magnetic paths of different mean lengths,
   said magnetic core being toroidal in shape and having an aperture between said magnetic paths of different mean lengths with said aperture being in the circumference of said toroidal shaped core;
   a first means in the form of a first winding through said aperture for sensing the magnetic flux in a magnetic path of one mean length;
   second means in the form of a second winding through said aperture for sensing the magnetic flux in a magnetic path of a second mean length,
   said first and second windings being series connected in voltage opposition to generate a signal when one of said magnetic paths is saturated and the other magnetic path is not saturated;
   at least one primary winding wound around said toroidal core; and,
   a switch means connected to said first and second windings and to said at least one primary winding for preventing the application of power to said at least one primary winding when said first and second windings generate said signal.

2. Saturable core apparatus as claimed in claim 1, wherein: said at least one primary winding includes first and second windings wound around said magnetic core; and,
   said switch means includes first and second semiconductor switches selectively connected to said first and second primary windings.

3. Saturable core apparatus as claimed in claim 2 including:
   a DC voltage source having one terminal connected to the emitters of said first and second semiconductors and the other terminal connected to one end of each of said first and second primary windings, the other end of said first primary winding being connected to the collector of said first semiconductor and the other end of said second primary winding being connected to the collector of said second semiconductor;
   a comparator having one input adapted for connection to a reference source and a second input connected to said series connected first and second winding, the other end of said first and second windings being connected to ground; and,
   means for connecting the output of said comparator to the bases of said first and second semiconductors.

4. Saturable core apparatus as claimed in claim 3, wherein said means for connecting the output of said comparator to said first and second transistors comprises:
   an inverter having its input connected to the output of said comparator;
   a flip-flop having its input connected to the output of said inverter;
   a square wave oscillator;
   a first two input AND gate having one input connected to one output of said square wave oscillator and a second input connected to one output of said flip-flop and an output connected to the base of said first transistor; and,
   a second two input AND gate having one input connected to the complementary output of said square wave oscillator and a second input connected to the complementary output of said flip-flop and an output connected to the base of said second transistor.